United States Patent
Goh et al.

(10) Patent No.: US 12,262,175 B2
(45) Date of Patent: Mar. 25, 2025

(54) ACOUSTIC TRANSDUCER AND METHOD FOR MANUFACTURING ACOUSTIC TRANSDUCER

(71) Applicant: AAC Technologies Pte. Ltd., Singapore (SG)

(72) Inventors: KianHeng Goh, Batu Pahat (MY); Chungmin Li, Taiwan (CN); Qiang Dan, Shenzhen (CN); Kahkeen Lai, Singapore (SG)

(73) Assignee: AAC Technologies Pte. Ltd., Singapore (SG)

( * ) Notice: Subject to any disclaimer, the term of this patent is extended or adjusted under 35 U.S.C. 154(b) by 265 days.

(21) Appl. No.: 18/110,845

(22) Filed: Feb. 16, 2023

(65) Prior Publication Data
US 2024/0284119 A1    Aug. 22, 2024

(51) Int. Cl.
*H04R 25/00* (2006.01)
*H04R 17/00* (2006.01)
*H04R 31/00* (2006.01)

(52) U.S. Cl.
CPC ......... *H04R 17/005* (2013.01); *H04R 31/006* (2013.01)

(58) Field of Classification Search
CPC .... H04R 17/005; H04R 31/006; H04R 17/02; H04R 31/00
USPC .......................................................... 381/190
See application file for complete search history.

(56) References Cited

U.S. PATENT DOCUMENTS

| | | | |
|---|---|---|---|
| 9,332,354 B2 * | 5/2016 | Conti | H04R 19/005 |
| 9,815,685 B2 * | 11/2017 | Chang | H04R 19/005 |
| 11,787,688 B2 * | 10/2023 | Lee | G01L 9/0042 |
| | | | 438/53 |
| 2010/0158279 A1 * | 6/2010 | Conti | H04R 19/005 |
| | | | 381/174 |
| 2023/0209241 A1 * | 6/2023 | Lo | H04R 1/1041 |
| | | | 381/328 |
| 2024/0284120 A1 * | 8/2024 | Goh | H04R 17/02 |

* cited by examiner

*Primary Examiner* — Phylesha Dabney
(74) *Attorney, Agent, or Firm* — W&G Law Group

(57) ABSTRACT

An acoustic transducer includes: substrate including first silicon layer, first oxide layer and second silicon layer, back chamber is formed therethrough; second oxide layer on the substrate; piezoelectric unit on the second oxide layer and including first electrode layer, piezoelectric layer and second electrode layer; slit and opening formed in the second electrode layer; metal pad stacked on the first electrode layer at the opening; and additional film layer including first and second parts, the first part is lay on the second electrode layer and covers the slit, and the second part is lay on the metal pad, through slot is formed penetrating the second part to expose the metal pad. Compared with the related art, additional film layer is formed by vapor deposition, and the piezoelectric unit can vibrate with maximum displacement and lowest restriction, thereby effectively improving SPL and structural reliability, which is suitable for larger acoustic transducers.

11 Claims, 3 Drawing Sheets

ACOUSTIC TRANSDUCER AND METHOD FOR MANUFACTURING ACOUSTIC TRANSDUCER

TECHNICAL FIELD

The present disclosure relates to the technical field of semiconductors and, in particular, to an acoustic transducer and a method for preparing an acoustic transducer.

BACKGROUND

Typical acoustic transducers utilize liquid or paste type polymers to create an additional film layer on top of a piezoelectric element using a spin-coating method. The polymer completely fills the accessible spaces on a patterned structure. However, there is a high risk that the spin coated materials may not distribute evenly on the different surface topographies. In addition, fully filled polymers may limit vibrating displacement and performance.

SUMMARY

The object of the present disclosure is to provide an acoustic transducer and a method for preparing an acoustic transducer, so as to solve the technical problems in the related art.

In a first aspect, the present disclosure provides an acoustic transducer, including: a substrate including a first silicon layer, a first oxide layer and a second silicon layer sequentially stacked from bottom to top, a back chamber is formed in the substrate, the back chamber sequentially penetrates through the first silicon layer and the first oxide layer, and the second silicon layer is exposed by the back chamber; a second oxide layer formed on the substrate; a piezoelectric unit formed on the second oxide layer and including a first electrode layer, a piezoelectric layer and a second electrode layer sequentially stacked from bottom to top; a slit formed in the middle of the second electrode layer and penetrating through the second electrode layer, the piezoelectric layer, the first electrode layer, the second oxide layer and the second silicon layer, the slit is communicated with the back chamber; an opening formed at an edge of the second electrode layer and penetrating through the second electrode layer and the piezoelectric layer, the first electrode layer is exposed by the opening; a metal pad stacked on the first electrode layer at the opening; and an additional film layer including a first part and a second part, the first part is lay on the second electrode layer and covers the slit, and the second part is lay on the metal pad, a through slot is formed penetrating through the second part and corresponding to the metal pad, and the metal pad is exposed by the through slot.

As an improvement, the first part and the second part have a height difference, and the second part is located below the first part.

As an improvement, the first part and the second part have a same thickness, and the thicknesses of the first part and the second part are consistent at each position.

As an improvement, the metal pad has a thickness smaller than the piezoelectric layer.

As an improvement, a gap is defined between a bottom surface of the second part and a top surface of the first electrode layer, and a plane where the bottom surface of the second part is located intersects with the piezoelectric layer.

As an improvement, the additional film layer is a photosensitive film.

In a second aspect, the present disclosure also provides a method for manufacturing an acoustic transducer, including: providing a substrate, the substrate includes a first silicon layer, a first oxide layer and a second silicon layer sequentially stacked from bottom to top; sequentially forming a second oxide layer, a first electrode layer, a piezoelectric layer and a second electrode layer on top of the second silicon layer from bottom to top; forming a slit by etching in the middle of the second electrode layer and forming an opening by etching at an edge of the second electrode layer, the slit sequentially penetrates through the second electrode layer, the piezoelectric layer, the first electrode layer, the second oxide layer and the second silicon layer, the opening penetrates through the second electrode layer and the piezoelectric layer, and the first electrode layer is exposed by the opening; forming a metal pad on the first electrode layer at the opening; forming an additional film layer, a first part of the additional film layer is lay on the second electrode layer and covers the slit, and a second part of the additional film layer is lay on the metal pad, a through slot is formed penetrating through the second part and corresponding to the metal pad, and the metal pad is exposed by the through slot; and forming a back chamber on bottom of the first silicon layer, wherein the back chamber sequentially penetrates through the first silicon layer and the first oxide layer, and the second silicon layer is exposed by the back chamber. process.

As an improvement, the additional film layer is a photosensitive film.

As an improvement, the additional film layer is formed by a rolling process.

As an improvement, the additional film layer is formed by a hot pressing.

As an improvement, the through slot is formed on the second part through a photolithography process.

Compared with the related art, in the present disclosure, the additional film layer is formed by rolling or hot pressing, and the first part of the additional film layer is lay on the second electrode layer and covers the slit, the second part is lay on the metal pad, a through slot is formed penetrating through the second part and corresponding to the metal pad, and the metal pad is exposed by the through slot, so that the piezoelectric unit can vibrate with the maximum displacement and the lowest restriction, thereby effectively improving the SPL and structural reliability, the thickness of the additional film layer is uniformly distributed on the top surface of the piezoelectric unit, which is suitable for acoustic transducers having a larger area.

REFERENCE SIGNS

10—substrate, 11—back chamber, 12—first silicon layer, 13—first oxide layer, 14—second silicon layer;
20—second oxide layer;
30—piezoelectric unit, 31—first electrode layer, 32—piezoelectric layer, 33—second electrode layer;
40—slit;
50—opening;

60—additional film layer, 61—first part, 62—second part, 63—through slot;
70—metal pad.

DESCRIPTION OF EMBODIMENTS

The embodiments described below with reference to the drawings are exemplary only for explaining the present disclosure and should not be construed as limiting the present disclosure.

Figure 1:
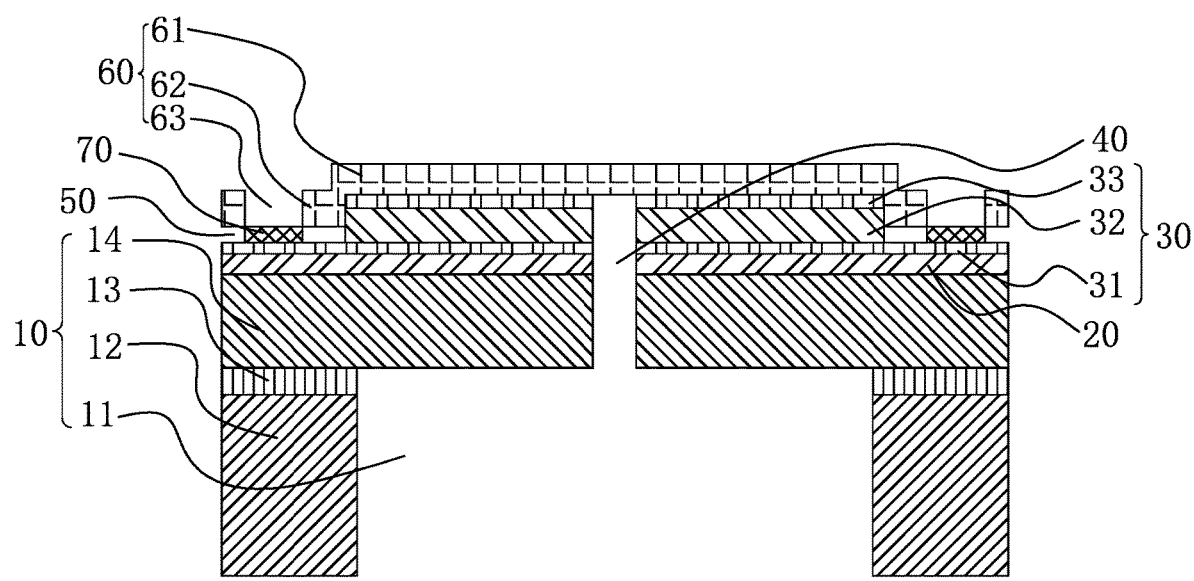
FIG. 1 is a schematic cross-sectional view of an acoustic transducer according to an embodiment of the present disclosure.

FIG. 1 is a schematic cross-sectional view of an acoustic transducer according to an embodiment of the present disclosure. As shown in FIG. 1, an embodiment of the present disclosure provides an acoustic transducer, including first silicon layer 10, second oxide layer 20, piezoelectric unit 30, additional film layer 60 and metal pad 70.

The substrate 10 includes from bottom to top a first silicon layer 12, a first oxide layer 13 and a second silicon layer 14. The substrate 10 is provided with a back chamber 11. Optionally, an inner contour surface of the back chamber 11 is a circular groove structure. The back chamber 11 sequentially penetrates through the first silicon layer 12 and the first oxide layer 13, and the second silicon layer 14 is exposed by the back chamber 11. In an embodiment, the first oxide layer 13 of $SiO_2$ material is prepared by vapor deposition method, thermal oxidation method or thermal decomposition method on the first silicon layer 12 of silicon material, and the second silicon layer 14 is formed on the first oxide layer 13 by vapor deposition method, thermal oxidation method or thermal decomposition method. The second silicon layer 14 and the first silicon layer 12 may be made of the same material. The first oxide layer 13 is located under the second silicon layer 14 and has a significantly lower etching rate compared with the second silicon layer 14. When the slit 40 or the back chamber 11 is formed, it is ensured that the etching process is more uniformly stopped at the interface of the first oxide layer 13 and the second silicon layer 14.

The second oxide layer 20 is formed on the substrate 10, and the second oxide layer 20 is formed by magnetron sputtering on the surface of the second silicon layer 14.

The piezoelectric unit 30 is formed on the second oxide layer 20 and includes from bottom to top a first electrode layer 31, a piezoelectric layer 32, and a second electrode layer 33 stacked in sequence.

The first electrode layer 31 is formed on the second oxide layer 20 by electron beam lift-off or magnetron sputtering, and the first electrode layer 31 is patterned by a photolithography process. The first electrode layer 31 is connected to the bottom electrode pad (not shown) through a bottom electrode lead (not shown), the material of the first electrode layer 31 can be one or more of Al, Mo, W, Pt, Cu, Ag, Au, ZrN, or may also be other materials with good electrical conductivity. In an embodiment, the first electrode layer 31 is made of molybdenum (Mo).

The piezoelectric layer 32 is deposited on the first electrode layer 31. The piezoelectric layer 32 has the characteristics of generating mechanical vibration in the presence of an electric field and the characteristics of generating an electric field when the mechanical vibration occurs. The piezoelectric layer 32 can be lead zirconate titanate, nitrogen aluminum oxide or barium titanate or any other piezoelectric material. In an embodiment, the piezoelectric layer 32 is made of aluminum nitride.

The second electrode layer 33 is formed on the piezoelectric layer 32 by the electron beam lift-off or the magnetron sputtering, and the second electrode layer 33 is patterned using a photolithography process. The second electrode layer 33 passes through the top electrode lead (not shown) is connected to the top electrode pad (not shown), and the material of the second electrode layer 33 can be one or more of Al, Mo, W, Pt, Cu, Ag, Au, ZrN, or other materials having good conductive property. In an embodiment, the second electrode layer 33 is made of molybdenum (Mo).

A slit 40 and an opening 50 are formed in the piezoelectric unit 30. The slit 40 is formed in the middle of the second electrode layer 33. In an embodiment, the slit 40 has an inner contour formed as a circular groove. An axis of the slit 40 coincides with an axis of the back chamber 11. The slit 40 sequentially penetrates through the second electrode layer 33, the piezoelectric layer 32, the first electrode layer 31, the second oxide layer 20 and the second silicon layer 14, until the slit 40 is in communication with the back chamber 11. The opening 50 is formed at an edge of the second electrode layer 33. Optionally, the opening 50 has a circular groove structure. The opening 50 sequentially penetrates through the second electrode layer 33 and the piezoelectric layer 32, and the first electrode layer 31 is exposed by the opening 50.

The metal pad 70 is stacked on the first electrode layer 31 at the opening 50, so that the metal pad 70 is electrically connected to the first electrode layer 31. In an embodiment, a patterned hard mask is formed on the second electrode layer 33, and the opening 50 is etched at the edge of the second electrode layer 33 through dry etching or wet etching, so that part of the first electrode layer 31 is exposed, and then the metal pad 70 is deposited on the first electrode layer 31 to form electrical connection.

The additional film layer 60 includes a first part 61 and a second part 62. In an embodiment, the first part 61 and the second part 62 integrally form into one piece, to facilitate the molding process and improve the structural stability. The second part 62 is located at the peripheral edge of the first part 61. The size and shape of the first part 61 conforms to the second electrode layer 33, and the first part 61 is lay on the second electrode layer 33 and covers the slit 40. The size and shape of the second part 62 conforms to the opening 50, and the second part 62 is lay on the metal pad 70 and covers the opening 50. A through slot 63 is formed penetrating through the second part 62. The position of the through slot 63 corresponds to the position of the metal pad 70. An orthographic projection of the metal pad 70 along the thickness direction of the second part 62 is located within the through slot 63, and the metal pad 70 is exposed by the through slot 63. The additional film layer 60 may be any type of polymer.

Through providing the additional film layer 60 to cover the slit 40, the sound pressure loss due to air leakage caused by the slit 40 is reduced. The additional film layer 60 has certain tensile deformation capacity, when the piezoelectric unit 30 vibrates, the additional film layer 60 deforms, to reduce the restriction to the movement of the piezoelectric unit 30.

In the present disclosure, the additional film layer 60 is formed by rolling or hot pressing, and the additional film layer 60 is stacked on the piezoelectric unit 30 and the metal pad 70. The additional film layer 60 is a photosensitive film. In an embodiment, the rolling includes using two or more rollers arranged in a certain form and the rolling the film to be stretched into an additional film layer 60 having a certain thickness and surface profile. The hot pressing process uses a movable mold and a fixed mold, and a mold cavity is provided between the movable mold and the fixed mold, the film is placed in the mold cavity and then hot-pressed to conform to the shape of the mold cavity, thereby completing the molding of the additional film layer 60. Alternatively, the additional thin film layer 60 may also be formed by photolithography process.

Compared to the typical fully filled liquid type, the piezoelectric unit 30 can vibrate with maximum displacement and lowest restriction, so as to effectively improve the SPL and the structural reliability.

In the present disclosure, the first part 61 and the second part 62 have a height difference. The second part 62 is located below the first part 61. During deformation of the piezoelectric unit 30, the deformation of the first part 61 is smooth due to the height difference, so as to avoid the restricted deformation of the piezoelectric unit 30, thereby improving the SPL and reliability of the acoustic transducer.

As shown in FIG. 1, the first part 61 and the second part 62 have the same thickness, and the thicknesses at each position of the first and second parts 61, 62 are consistent. The deformation process of the piezoelectric unit 30 is parabolic, so as to avoid the restricted deformation of the piezoelectric unit 30 due to the arrangement of the additional film layer 60, thereby improving the reliability of the acoustic transducer.

As shown in FIG. 1, the thickness of the metal pad 70 is smaller than the thickness of the piezoelectric layer 32, the plane of where the bottom of the second part 62 is located intersects with the piezoelectric layer 32, and a gap is defined between the bottom surface of the second part 62 and the top surface of the first electrode layer 31. As a result, when the piezoelectric layer 32 deforms, less restriction occurs, which further improve compliance of the acoustic transducer.

Figure 2A:
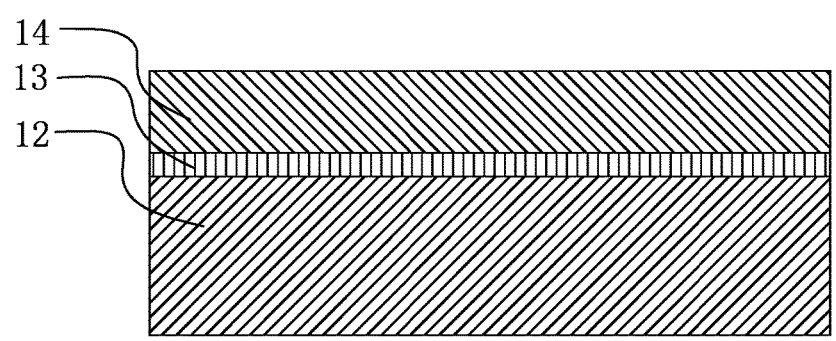
FIGS. 2A-2E are flow diagrams of showing manufacture of an acoustic transducer according to embodiments of the present disclosure.

FIGS. 2A-2E are flow diagrams of showing manufacture of an acoustic transducer according to embodiments of the present disclosure. The method includes the following process:

As shown in FIG. 2A, a substrate 10 is provided. A first silicon layer 12 is formed. The first oxide layer 13 of $SiO_2$ material is prepared by vapor deposition method, thermal oxidation method or thermal decomposition method on the first silicon layer 121, and the second silicon layer 14 is formed on the first oxide layer 13 by vapor deposition method, thermal oxidation method or thermal decomposition method. The second silicon layer 14 and the first silicon layer 12 can be made of the same material.

Figure 2B:
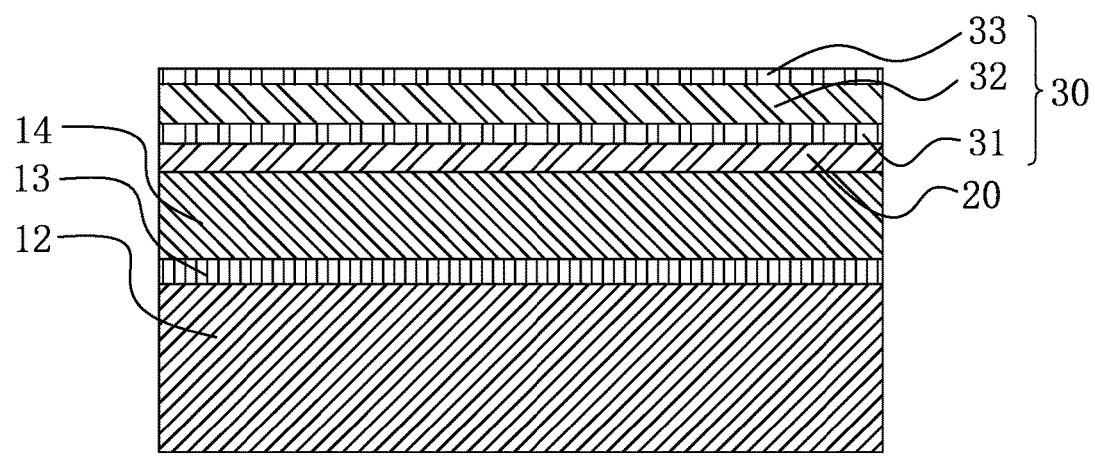

As shown in FIG. 2B, a second oxide layer 20 is grown on the surface of the second silicon layer 14 by magnetron sputtering. A piezoelectric unit 30 is formed on the second silicon layer 14. The first electrode layer 31 is formed on the second oxide layer 20 by electron beam lift-off or magnetron sputtering, and the first electrode layer 31 is patterned by using a photolithography process. The first electrode layer 31 is connected to the bottom electrode pad through a bottom electrode lead. The piezoelectric layer 32 is deposited on the first electrode layer 31, the second electrode layer 33 is formed on the piezoelectric layer 32 by electron beam lift-off or magnetron sputtering, and the second electrode layer 33 is patterned using the photolithography process. The second electrode layer 33 is connected to the top electrode pad through a top electrode lead.

Figure 2C:
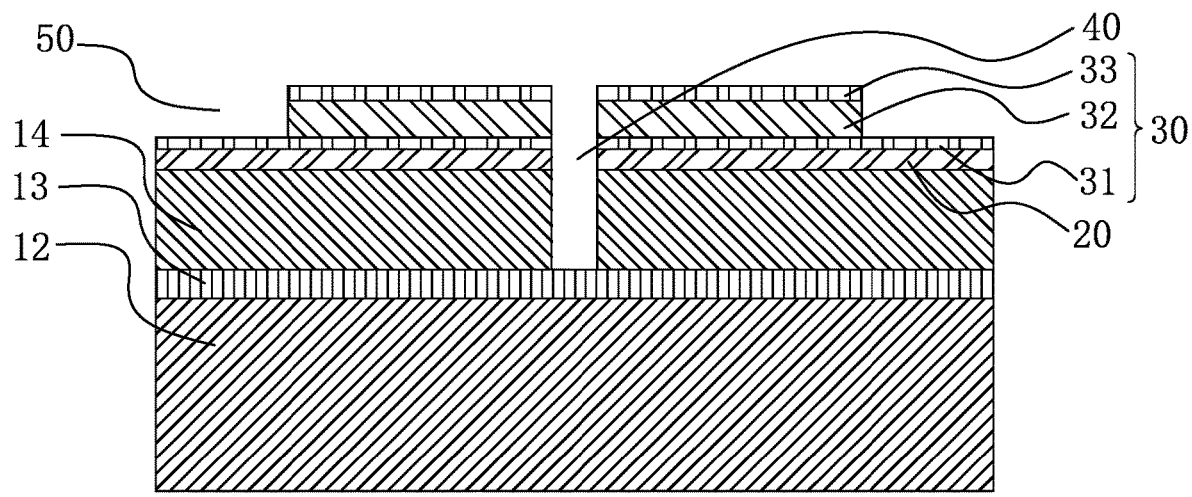

As shown in FIG. 2C, a slit 40 is etched in the middle of the second electrode layer 33, and an opening 50 is etched at the edge of the second oxide layer 33. The slit sequentially penetrates through the second electrode layer 33, the piezoelectric layer 32, the first electrode layer 31, the second oxide layer 20 and the second silicon layer 14. The opening 50 sequentially penetrates the second electrode layer 33 and the piezoelectric layer 32, and the first electrode layer 31 is exposed by the opening 50. In an embodiment, a patterned hard mask is formed on the second electrode layer 33, and the slit 40 and the opening 50 are formed in the second electrode 33 by dry etching or wet etching.

Figure 2D:
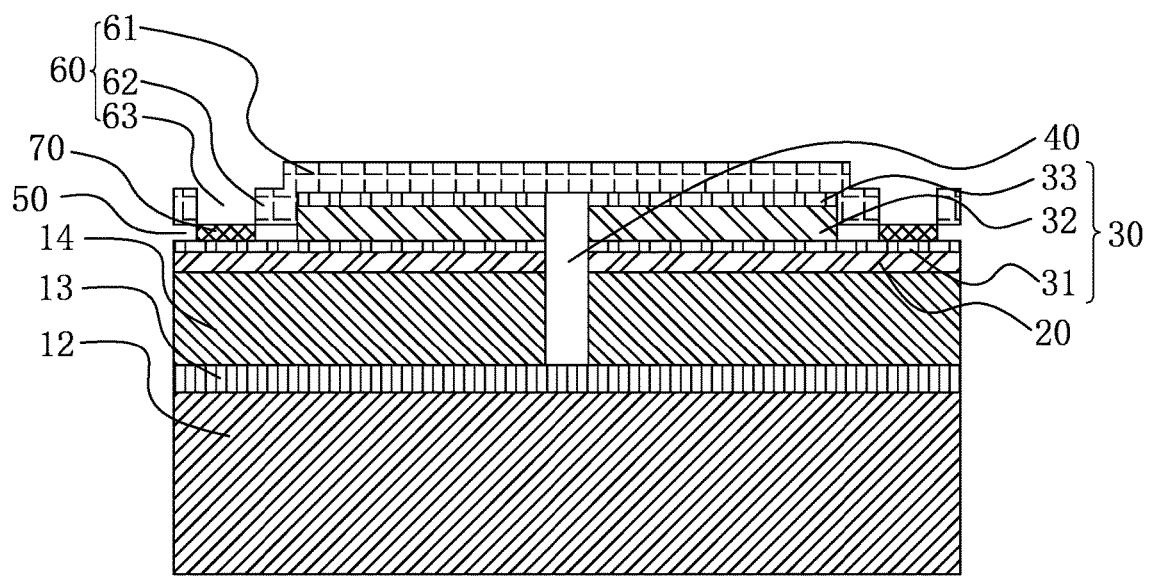

As shown in FIG. 2D, a metal pad 70 is deposited on the first electrode layer 31 at the opening 50. The metal pad 70 is deposited on the first electrode layer 31 by electron beam lift-off or magnetron sputtering to form an electrical connection. An additional film layer 60 is formed by rolling or hot pressing. The second part 62 is lay on the metal pad 70 and covers the opening 50. A through slot 63 is formed penetrating through the second part 62. The position of the through slot 63 corresponds to the position of the metal pad 70. An orthographic projection of the metal pad 70 along the thickness direction of the second part 62 is located within the through slot 63, and the metal pad 70 is exposed by the through slot 63. In an embodiment, the additional film layer 60 is a photosensitive film. In an embodiment, the rolling includes using two or more rollers arranged in a certain form and the rolling the film to be stretched into an additional film layer 60 having a certain thickness and surface profile. The hot pressing process uses a movable mold and a fixed mold, and a mold cavity is provided between the movable mold and the fixed mold, the film is placed in the mold cavity and then hot-pressed to conform to the shape of the mold cavity.

Figure 2E:
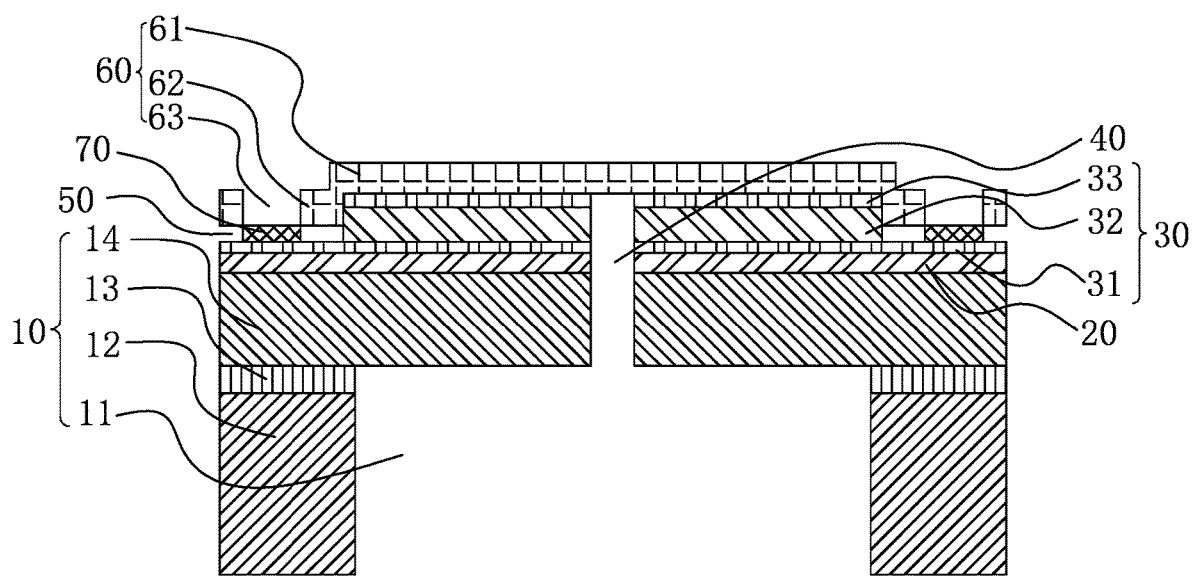

As shown in FIG. 2E, a back chamber 11 is formed on the bottom of the first silicon layer 12. The back chamber 11 sequentially penetrates through the first silicon layer 12 and the first oxide layer 13, and the second silicon layer 14 is exposed by the back chamber 11. In an embodiment, the back chamber 11 is formed by dry etching or wet etching.

In the acoustic transducer prepared by the above-mentioned methods, the additional film layer 60 is formed by rolling or hot pressing, and the first part 61 of the additional film layer 60 is lay on the second electrode layer 33 and covers the slit 40, the second part 62 is lay on the metal pad 70, so that the piezoelectric unit 30 can vibrate with the maximum displacement and the lowest restriction, thereby effectively improving the SPL and structural reliability, the thickness of the additional film layer 60 is uniformly distributed on the top surface of the piezoelectric unit 30, which is suitable for acoustic transducers having a larger area.

The structures, features and effects of the present disclosure have been described in detail above based on the embodiments shown in the drawings. The above descriptions are only preferred embodiments of the present disclosure, but the present disclosure is not limited to the embodiments shown in the drawings. Changes or modifications made based on the concept of the present disclosure are still within the protection scope of the present disclosure.

What is claimed is:

1. An acoustic transducer, comprising:
 a substrate including a first silicon layer, a first oxide layer and a second silicon layer sequentially stacked from bottom to top, wherein a back chamber is formed in the substrate, the back chamber sequentially penetrates through the first silicon layer and the first oxide layer, and the second silicon layer is exposed by the back chamber;
 a second oxide layer formed on the substrate;
 a piezoelectric unit formed on the second oxide layer and including a first electrode layer, a piezoelectric layer and a second electrode layer sequentially stacked from bottom to top;
 a slit formed in the middle of the second electrode layer and penetrating through the second electrode layer, the piezoelectric layer, the first electrode layer, the second oxide layer and the second silicon layer, wherein the slit is communicated with the back chamber;

an opening formed at an edge of the second electrode layer and penetrating through the second electrode layer and the piezoelectric layer, wherein the first electrode layer is exposed by the opening;

a metal pad stacked on the first electrode layer at the opening; and an additional film layer including a first part and a second part, wherein the first part is lay on the second electrode layer and covers the slit, and the second part is lay on the metal pad, a through slot is formed penetrating through the second part and corresponding to the metal pad, and the metal pad is exposed by the through slot.

2. The acoustic transducer according to claim 1, wherein the first part and the second part have a height difference, and the second part is located below the first part.

3. The acoustic transducer according to claim 1, wherein the first part and the second part have a same thickness, and the thicknesses of the first part and the second part are consistent at each position.

4. The acoustic transducer according to claim 1, wherein the metal pad has a thickness smaller than the piezoelectric layer.

5. The acoustic transducer according to claim 1, wherein a gap is defined between a bottom surface of the second part and a top surface of the first electrode layer, and a plane where the bottom surface of the second part is located intersects with the piezoelectric layer.

6. The acoustic transducer according to claim 1, wherein the additional film layer is a photosensitive film.

7. A method for manufacturing an acoustic transducer, comprising:

providing a substrate, wherein the substrate includes a first silicon layer, a first oxide layer and a second silicon layer sequentially stacked from bottom to top;

sequentially forming a second oxide layer, a first electrode layer, a piezoelectric layer and a second electrode layer on top of the second silicon layer from bottom to top;

forming a slit by etching in the middle of the second electrode layer and forming an opening by etching at an edge of the second electrode layer, wherein the slit sequentially penetrates through the second electrode layer, the piezoelectric layer, the first electrode layer, the second oxide layer and the second silicon layer, the opening penetrates through the second electrode layer and the piezoelectric layer, and the first electrode layer is exposed by the opening;

forming a metal pad on the first electrode layer at the opening;

forming an additional film layer, wherein a first part of the additional film layer is lay on the second electrode layer and covers the slit, and a second part of the additional film layer is lay on the metal pad, a through slot is formed penetrating through the second part and corresponding to the metal pad, and the metal pad is exposed by the through slot; and forming a back chamber on bottom of the first silicon layer, wherein the back chamber sequentially penetrates through the first silicon layer and the first oxide layer, and the second silicon layer is exposed by the back chamber.

8. The method according to claim 7, wherein the additional film layer is a photosensitive film.

9. The method according to claim 8, wherein the additional film layer is formed by a rolling process.

10. The method according to claim 8, wherein the additional film layer is formed by a hot pressing process.

11. The method according to claim 8, wherein the through slot is formed on the second part through a photolithography process.

* * * * *